(12) United States Patent
Hämmerle

(10) Patent No.: US 7,562,729 B2
(45) Date of Patent: Jul. 21, 2009

(54) SHOPPING CART

(75) Inventor: Jürgen Hämmerle, Günzburg (DE)

(73) Assignee: Wanzl Metallwarenfabrik GmbH, Leipheim (DE)

( * ) Notice: Subject to any disclaimer, the term of this patent is extended or adjusted under 35 U.S.C. 154(b) by 8 days.

(21) Appl. No.: 12/016,463

(22) Filed: Jan. 18, 2008

(65) Prior Publication Data
US 2008/0122227 A1    May 29, 2008

Related U.S. Application Data

(63) Continuation of application No. PCT/EP2006/006891, filed on Jul. 14, 2006.

(30) Foreign Application Priority Data

Jul. 20, 2005 (DE) .................. 20 2005 011 625 U

(51) Int. Cl.
B60K 1/00 (2006.01)
(52) U.S. Cl. ............ 180/65.1; 280/33.992; 280/DIG. 4
(58) Field of Classification Search ............ 280/33.991, 280/33.992, 33.994, DIG. 4; 180/65.1, 65.3
See application file for complete search history.

(56) References Cited

U.S. PATENT DOCUMENTS

| 4,096,920 | A | * | 6/1978 | Heyn | 180/11 |
| 4,771,840 | A | * | 9/1988 | Keller | 180/11 |
| 5,064,012 | A | * | 11/1991 | Losego | 180/19.1 |
| 5,072,956 | A | * | 12/1991 | Tannehill et al. | 280/33.992 |
| 5,158,310 | A | * | 10/1992 | Tannehill et al. | 280/33.992 |
| 5,357,182 | A |   | 10/1994 | Wolfe et al. | |
| 6,037,869 | A | * | 3/2000 | Lace | 340/568.5 |
| 6,343,665 | B1 | * | 2/2002 | Eberlein et al. | 180/19.1 |
| 6,774,503 | B1 | * | 8/2004 | Chen | 290/1 R |
| 2002/0158432 | A1 |   | 10/2002 | Wain | |

FOREIGN PATENT DOCUMENTS

EP    0 421 578    4/1991
WO   WO 2004/031017 A   4/2004

OTHER PUBLICATIONS

European Search Report for PCT/EP2006/006891, dated Nov. 27, 2006.

* cited by examiner

Primary Examiner—Christopher P Ellis
Assistant Examiner—Brian Swenson
(74) Attorney, Agent, or Firm—Buchanan Ingersoll & Rooney PC

(57) ABSTRACT

A push cart includes a frame, a pushing device, a plurality of casters, one or more electric consumers, at least one rechargeable battery, and at least one power generator that can be driven via a traveling motion of the cart and is connected to the at least one rechargeable battery.

24 Claims, 2 Drawing Sheets

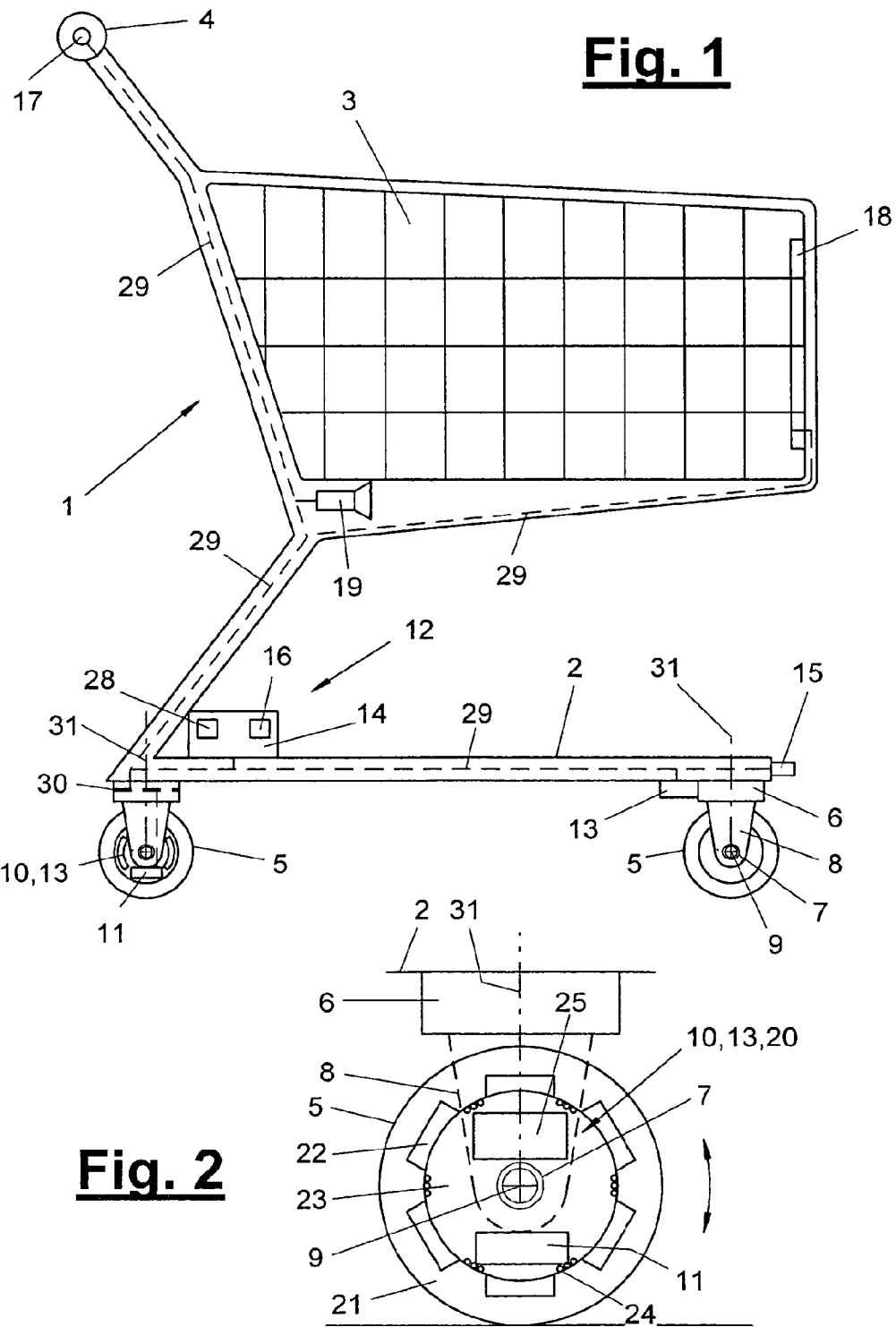

SHOPPING CART

CROSS-REFERENCE TO RELATED APPLICATION

The present application is a continuation of PCT/EP2006/006891, filed on Jul. 14, 2006, and which claims the priority of DE 20 2005 011 615.4, filed on Jul. 20, 2005, and the entire contents of both applications are incorporated herein by reference.

BACKGROUND

1. Field of the Invention

The invention relates to a cart, particularly a shopping cart, having the characteristics pursuant to the preamble of the main claim.

2. Description of Related Art

A shopping cart of this type is known from U.S. Pat. No. 6,362,728 B1. It comprises a frame having a plurality of casters and a pushing handle. The shopping cart is equipped with an anti-theft device, which comprises braking devices in the casters and can be actuated from the outside via a signal by radio or the like. The electric energy is provided by a battery.

OBJECTS AND SUMMARY

It is an object of the present invention to provide a better cart, particularly a shopping cart.

One or more power generators ensure self-sufficient energy supply of the cart and the electrical consumers provided thereon. The kinetic energy required for generating the power is derived from the traveling motion of the cart. To ensure a permanent power supply, a rechargeable power supply, such as a rechargeable battery, may be provided.

For anti-theft devices, transponders, acoustic and optical measuring devices, as well as other electric consumers, a relatively low amount of electric energy suffices. The rechargeable battery is adjusted to the energy demand and can have an accordingly low capacitance. For this energy, level relatively low electro-motor forces are required, so that the handling of the cart or shopping cart is not made difficult and not impaired. In addition, it is possible to use the power generator and the rechargeable battery for driving the cart by motor, which has a supporting effect during the traveling motion and makes pushing or pulling easier for the user.

In one embodiment, the power generator ensures only the generation of power and is therefore suitably configured for example as an electric generator. In addition, the power generator can be configured as a controllable braking device, which can be used in a variety of ways and in particular can be part of a safety device, specifically an anti-theft device. The maintenance effort required according to the above-mentioned state of the art for replacing the battery and the elimination of wear problems is dispensed with. The power generator can expediently exercise a braking function, particularly like a regenerating brake. It is particularly advantageous to configure the power generator as a direct electric drive, which is integrated in the caster.

The electric generator may take on different designs. Electric machines of this type can operate as generators or motors, depending on whether mechanical or electric energy is applied to them. A direct drive that is configured as a brushless motor or electronically commutated motor is particularly advantageous. Such a motor has particularly high efficiency, which exceeds that of normal induction motors. Furthermore, the claimed motor exhibits better properties with respect to weld strength, heat development and the like.

The electric consumers on the cart may take on any arbitrary design and number. In addition, they can be provided in any arbitrary location. The self-sufficient power generation function guarantees a longer service life and higher operational reliability. In addition, a higher number and more demanding electric consumers can be installed. The dedicated energy supply in particular makes it possible to equip the cart with a comprehensive safety and alarm system as well as with a wireless remote data transmission device, particularly a radio device.

The entire electrical installation, including the power generator, can be hidden on the cart or shopping cart and installed such that it is protected from vandalism. Accommodating the power generator and particularly the direct drive on the inside of one or more casters has the advantage that the arrangement is invisible and protected from negative influences of the environment, particularly dampness. When using an electric generator, and particularly a direct drive, it is advantageous to provide the roller body of the castor as a rotor and provide it with permanent magnets. The stator comprising the windings and the remaining components, particularly the electronic control unit and the rechargeable battery, can be accommodated in the relatively stationary axle body. This enables a particularly protected and kinematically advantageous arrangement. In addition, the cable routing to the consumers is simplified on the cart.

BRIEF DESCRIPTION OF THE DRAWINGS

The embodiments of the invention are shown in the figures by way of example and in schematic illustrations, wherein:

FIG. 1: shows a side view of a shopping cart comprising a power generator and a plurality of electric consumers, FIG. 2: an enlarged and cut-off side view of a caster having a direct drive.

DETAILED DESCRIPTION OF THE PREFERRED EMBODIMENTS

Figure 4:
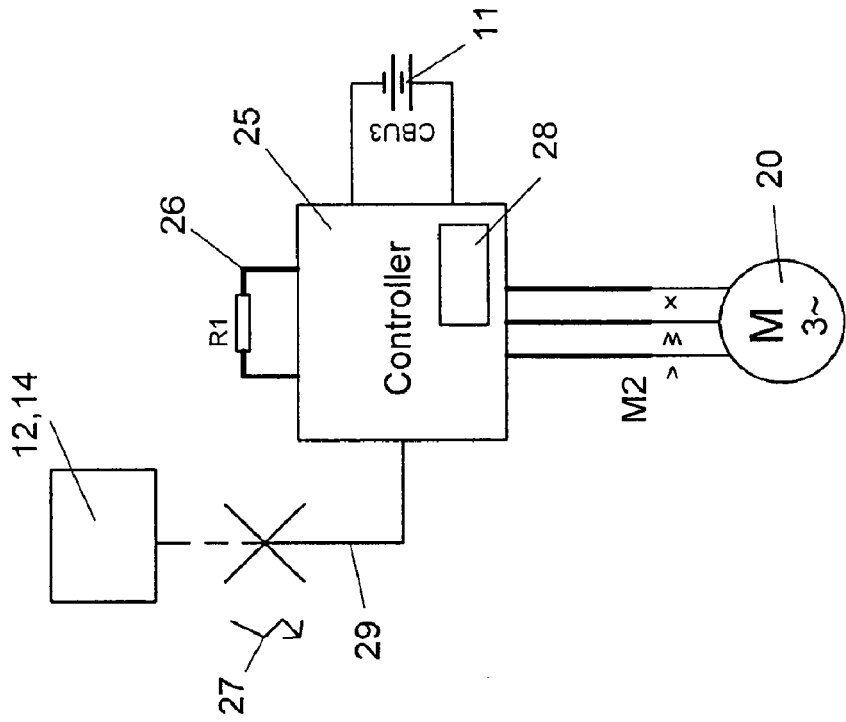
FIGS. 3 and 4: show wiring diagrams of the direct drive and electronic control unit in two different operational states.

FIG. 1 shows a side view of a cart (1). The cart (1) can have any arbitrary design. It is preferably a shopping cart. Alternatively it can be a luggage cart, a platform cart or the like.

The cart (1) comprises a frame (2) having at least one suitable product storage area (3), for example, the shopping basket shown in the figure. The cart (1) furthermore comprises a pushing device (4), for example a handle, which the user can use to push or pull the cart (1). On the bottom of the frame (2) a plurality of casters (5) are provided, which in addition to the roller axis (9) may optionally be provided with a swivel bearing (6) and a vertical swivel axis (31). On the illustrated cart (1), four evenly distributed casters (5) are provided. Alternatively, a different number of rollers, for example, two or three casters (5), may be present.

At least one power generator (10) is disposed on the cart (1). The generator is driven by the traveling motion of the cart (1) so the manual power of the user applied during pulling or pushing of the cart (1) is converted into electric power. The power generator (10) can be electrically connected to at least one rechargeable power supply (11), for example a rechargeable battery.

One or more electric consumers (12) to (19) are disposed on the cart (1). In a first embodiment, the power generator (10) may only be provided to supply the electric power for these consumers (12) to (19). In a second embodiment, the power generator (10) at the same time represents a controllable braking device.

The kinetic or mechanical energy acting on the power generator (10) during travel of the cart (1) can be derived in any arbitrary manner. The power generator (10), for example, may comprise a separate driving wheel, which has a mechanical rolling connection to the subsurface. In the preferred embodiment, the power generator (10) is disposed in the region of a caster (5) and is preferably connected thereto. The power generator (10) can engage the caster (5) by means of a friction wheel, for example in the manner of a bicycle dynamo, and absorb the rolling motions thereof. In the preferred embodiment shown in the figures, the power generator (10) is integrated in the caster (5). A plurality of power generators (10) may also be present. In particular, a plurality of casters (5) may include integrated power generators (10).

The power generator (10) is configured as an electric generator and inductively converts the mechanical energy into a magnetic field by means of the relative rotation of one or more coils. In the illustrated embodiment, the power generator (10) is configured as a direct electric drive integrated in the caster (5), the drive being accommodated encapsulated on the inside of the caster (5). It is preferably configured as an electronically commutated motor (20) or a brushless motor. The electronically commutated motor (20) comprises an electronic control unit (25), which allows the motor to be switched between generator operation and braking operation. The electronic control unit (25) can receive the appropriate switching commands or switching signals in any arbitrarily suited manner. For this purpose, the electronic control unit (25) may be equipped with a dedicated transceiver for the preferably wirelessly transmitted signals, such as radio signals. In the illustrated embodiment, the electronic control unit (25) is connected to a further controller, for example a cart controller (14).

As illustrated in FIG. 2, the exterior roller body (21) of the caster (5) forms the rotor of the electronically commutated motor (20). The relatively stationary axle body (23) forms the stator of the motor (20). The axle body (23) is non-rotatably connected to the roller holder (8), such as a bearing fork. The roller body (21) is mounted freely rotatably on the axle body (23) by means of a roller bearing (7) having a roller axis (9) parallel to the ground. The roller body (21) provided with a liner has the shape of a hollow cylindrical and optionally multi-part housing, which on the exterior extends across radially protruding parts of the axle body (23) and shields them toward the outside. The roller holder (8) in turn can be connected to the aforementioned swivel bearing (6) such that the caster (5) can swivel freely about the vertical axis (31). Of the plurality of casters (5) on the cart (1), all or only part of them can be provided with a swivel bearing (6).

On the illustrated motor (20), a plurality of magnetic field generators, preferably in the form of permanent magnets, are disposed on the exterior rotor or roller body (21). The stator or the axle body (23) comprises a plurality of electrical windings (24). As FIG. 2 illustrates, the electronic control unit (25) and the rechargeable battery (11) are disposed in the axle body (23) or the stator. Alternatively, an external arrangement in a different location of the cart (1) is possible. According to FIG. 1, the power generator (10) is connected via one or more electrical cables (29) to the one or more consumers (12, 19) disposed on the frame (2). The cables (29) are accommodated on the frame parts in a protected and preferably hidden manner. In particular, they can be routed in frame conduits. Across the cable routings one or more power transmitters (30) can be provided. These can be in particular rotary transmitters or slip ring transmitters (30) located in the region of the swivel bearing (6), which ensure the transmission of power across the swivel axis (31).

Figure 3:
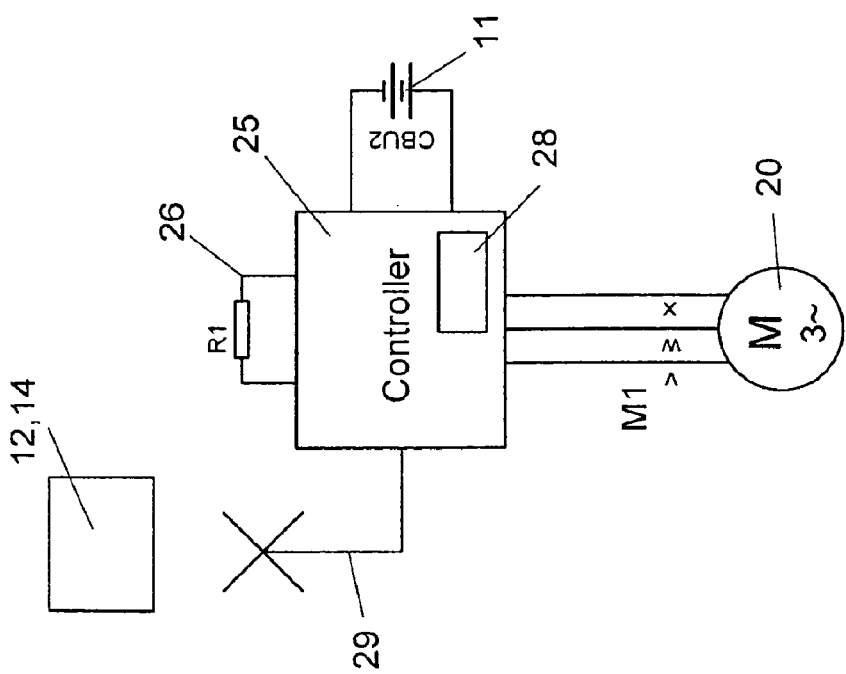

In the embodiment shown in FIGS. 2 to 4, the three-phase motor (20) is connected via cables to the electronic control unit (25). The electronic control unit (25), also referred to as a controller, is in turn connected via cables to the rechargeable battery (11). The electric consumers (12) to (19) can be connected via the cables (29) to the rechargeable battery (11). Signal and power currents can be transmitted via the cables (29). For signal transmission purposes, a cable connection exists to the electronic control unit (25).

The electronic control unit (25) is provided with a shorting bar (26) having a base load R. The control or brake signal for switching between generator and braking operation is sent in the manner described above from the control unit (14) via a cable (29) to the electronic control unit (25). Alternatively, a dedicated transceiver may be provided.

FIG. 3 shows the brushless motor (20) during normal operation or generator operation. If a user or customer moves the cart (1), the rolling motion of the rotor or roller body (21) results in the creation of a small current due to preferably hardly noticeable resistance. In this case, no external brake signal is applied. A minimal amount of charge current flows to the rechargeable battery (11).

The brushless motor (20) is operated as a generator with controllable power consumption. FIG. 4 illustrates the circuitry during the braking operation. When a brake signal (27) is applied, maximum braking current flows across the shorting bar. The brushless motor (20) acts as a short-circuited generator and applies massive braking power. The faster the user attempts to push the cart (1), the higher the resisting moment and braking force. Also during the braking operation, a charge current may flow to the rechargeable battery (11). As soon as the external brake signal (27) decreases, the brushless motor (20) returns to normal or generator operation.

The switchable braking ability of the power generator (10) can be utilized in a variety of ways. In the embodiment shown, the cart (1) comprises a safety device (12), which is configured, for example, as an anti-theft device. If the customer moves the cart (1) outside of the area of a store and passes the parking lot boundaries, for example, this can be detected in any arbitrarily suited manner. This may occur, for example, via a sensor system (15) installed on the cart (1); the system being connected to the power generator (10) and to a control unit (14) of the safety device (12). The sensor system (15) can receive, for example, magnetic signals, inductive signals, or radio signals. If such an unauthorized traveling motion of the cart (1) is detected, the control unit (14) issues the braking signal (27) to the electronic control unit (25) and prevents, or at least hampers, any further traveling motion. If the cart (1) is returned to the normal usage range of the store, such a move is likewise detected via the sensor system (15), resulting in the shut-off of the brake signal (27) and ensuring free mobility of the cart. Disconnection may also be performed by means of a special hand sensor or the like.

Alternatively or additionally, the safety device (12) may comprise further blocking devices (13), which, for example, block or hamper the swivel motion of one or more casters (5) by the engagement of pins and are configured as described in DE 203 14 705 U1. In a further variant, the power generator (10) can be combined with a separate braking device in or on the caster (5). This braking device can be configured, for example, in accordance with U.S. Pat. No. 6,362,728 B1 mentioned above and may comprise adjustable brake shoes. FIG. 1 indicates this variant in the left caster (5).

Furthermore, one or more active or passive transponders (17) or RFID chips may be disposed on the cart (1). These transponders are preferably readable and rewritable and allow variable memory or signal emission. They can be modified, for example, with respect to their identification or information content by an external transmitting device. In this way, operational states, local associations, markings or similar other information can be stored by the transponder (17). The transponder (17) is provided, for example, on the handle (4), on or in a caster (5), or in any arbitrary other location of the cart (1). The transponder (11) can be an active component and, being an electric consumer, it can likewise be connected to the power generator (10).

The cart (1) can furthermore be provided with a wireless remote transmission device (16), which is connected to the control unit (14), for example. The transponder (17) or sensor system (15) can be part of the remote data transmission system (16). In this way, messages and other signals can be exchanged in a wireless manner with other transmitters/receivers.

In addition, the cart (1) may comprise one or more notification devices (18, 19), which emit optical or visual or acoustic signals and messages, for example. This can be, for example, the display (18) provided at the front in the basket (3) in FIG. 1. In this way, for example, the user or customer can be provided with advertising information, which is input as a function of the respective location. The corresponding control signals can be transmitted from the outside via the remote data transmission system (16) or the transponder (17). An acoustic notification device (19) can include, for example, a smaller speaker, a buzzer, or the like. In this way, warning signals can be issued in the simplest manner, for example in the case of unauthorized removal of the cart (1) from the store. The acoustic notification device (19) is then triggered by the safety device (12). More complex information, such as individual advertising information regarding specials, store areas that the user has not visited yet, the return of a cart to a holding area and the like, can be provided via a speaker. Furthermore, alarms in the event of cart theft or due to bypassing of the cash register area without payment for the goods can be signaled.

The cart (1) may be provided with a central cart control unit (14), which centrally unites and controls the above-mentioned functions.

One or more of the above control units (14, 25) may be provided with one or more memory elements (28) for different operating and user data. By tapping into the motor or generator rotation, the length of the travel path can be determined and stored. Alternatively or additionally, travel times can be detected and stored. In this way, distances traveled by and loads of the cart (1) can be determined and maintenance intervals can be defined. The need for maintenance can be signaled to the store operator via the notification devices (18, 19) or also via the remote data transmission system (16). Furthermore, location-specific data can be recorded and stored. This applies, for example, to the passing of certain areas of the store or the cash registers, the time spent in the store between removal from the holding area and return, or the like. In addition, operational states of the consumers (12) or (19) and/or of the power generator (10) and/or of the rechargeable battery (11), such as the charge state of the battery, can be detected and stored. The memory element or elements (28) can be scanned and read in suitable locations via the remote data transmission system (16) or via the transponder or transponders (17).

Modifications of the illustrated embodiments are possible in a variety of ways. This relates on the one hand to the design of the cart (1) and on the other hand to the technical design and arrangement of the power generator (10) as well as the rechargeable battery (11). It is also conceivable to change the arrangement and design of the casters (5). Instead of the preferred soft liner made of rubber, soft plastic or the like, they may, for example, be provided with a harder and more wear-resistant liner. A softer and more comfortable liner can be used in connection with the brushless motor (20) or a braking device having soft braking action. Hard liners are more suited for braking devices that strictly block the rolling motion of the caster (5) and slide across the ground during further movement of the cart (1) and are subject to wear. In addition, the configuration of the brushless motor (20) can be modified.

LIST OF REFERENCE NUMERALS

1 Cart, shopping cart
2 Frame
3 Product storage area, basket
4 Pushing device, handle
5 Caster
6 Swivel bearing
7 Roller bearing
8 Roller holder, bearing fork
9 Roller axis
10 Power generator, generator
11 Rechargeable power supply, rechargeable battery
12 Consumer, safety device
13 Consumer, blocking device
14 Consumer, control unit, cart controller
15 Consumer, sensor system
16 Consumer, remote data transmission system
17 Consumer, transponder
18 Consumer, optical notification device, display
19 Consumer, acoustic notification device
20 Brushless motor, electronically commutated motor
21 Rotor, roller body
22 Permanent magnet
23 Stator, axle body
24 Winding
25 Electronic control unit, controller
26 Shorting bar
27 Brake signal
28 Memory element
29 Cable
30 Transmitter, slip ring transmitter
31 Swivel axis, vertical axis

The invention claimed is:

1. A push cart comprising a frame, a pushing device, a plurality of casters, one or more electric consumers, at least one rechargeable battery, and at least one power generator that can be driven via a traveling motion of the cart and is connected to the at least one rechargeable battery such that a charge current flows to the at least one rechargeable battery during a normal generator operation, wherein the power generator is configured as a direct electric drive motor, and wherein the motor includes an electronic control unit having a shorting bar such that the motor can be switched between the normal generator operation and a braking operation in which braking current flows across the shorting bar and the traveling motion of the cart is hampered.

2. The cart according to claim 1, wherein the power generator is disposed in the region of a caster.

3. The cart according to claim 1, wherein the power generator is connected to the caster and preferably integrated in the caster.

4. The cart according to claim 1, wherein the power generator is configured as an electric generator.

5. The cart according to claim 1, wherein the power generator is configured as a direct drive integrated in the caster.

6. The cart according to claim 1, wherein the power generator is configured as an electronically commutated motor.

7. The cart according to claim 1, wherein the electronic control unit is connected to a cart control unit.

8. The cart according to claim 1, wherein the power generator is disposed in the region of a caster, a roller body of the caster forming a rotor and an axle body forming a stator of the electronically commutated motor.

9. The cart according to claim 8, wherein the rotor comprises permanent magnets and the stator comprises electric windings.

10. The cart according to claim 8, wherein the electronic control unit is disposed in the stator.

11. The cart according to claim 8, wherein the rechargeable battery is disposed in the stator.

12. The cart according to claim 1, wherein the electronic control unit and/or the rechargeable battery are connected via one or more electrical cables to one or more electric consumers provided on the frame.

13. The cart according to claim 12, wherein one or more power transmitters are provided across the one or more electrical cables.

14. The cart according to claim 13, wherein said one or more power transmitters comprise rotary transmitters.

15. The cart according to claim 13, wherein said one or more power transmitters comprise slip ring transmitters.

16. The cart according to claim 1, wherein the cart comprises a safety device, particularly an anti-theft device, which is connected to the power generator.

17. The cart according to claim 16, wherein the safety device comprises one or more blocking devices for the movement of the cart, the devices being configured as separate devices or as power generators capable of braking.

18. The cart according to claim 1, wherein the cart comprises one or more, preferably rewritable transponders.

19. The cart according to claim 1, wherein the cart comprises a sensor system.

20. The cart according to claim 1, wherein the cart comprises a remote data transmission system.

21. The cart according to claim 1, wherein the cart comprises one or more optical and/or acoustic notification devices.

22. The cart according to claim 1, wherein the cart comprises a central cart control unit.

23. The cart according to claim 1, wherein the cart comprises a product storage area, particularly a basket.

24. The cart according to claim 23, wherein the product storage area comprises a basket.

* * * * *